US009351245B2

(12) United States Patent
Ma (10) Patent No.: US 9,351,245 B2
(45) Date of Patent: May 24, 2016

(54) METHOD FOR REGULATING TRANSMIT POWER AND WIRELESS ROUTING DEVICE (71) Applicant: Huawei Technologies Co., Ltd., Shenzhen (CN)

(72) Inventor: Tao Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 231 days.

(21) Appl. No.: 13/922,569

(22) Filed: Jun. 20, 2013

(65) Prior Publication Data
US 2013/0343253 A1 Dec. 26, 2013

(30) Foreign Application Priority Data

Jun. 20, 2012 (CN) .......................... 2012 1 0205375

(51) Int. Cl.
| H04W 4/00 | (2009.01) |
| H04W 52/02 | (2009.01) |
| H04W 52/46 | (2009.01) |
| H04W 52/14 | (2009.01) |
| H04W 52/28 | (2009.01) |

(52) U.S. Cl.
CPC .......... *H04W 52/0206* (2013.01); *H04W 52/46* (2013.01); *H04W 52/143* (2013.01); *H04W 52/146* (2013.01); *H04W 52/28* (2013.01); *H04W 52/288* (2013.01); *Y02B 60/50* (2013.01)

(58) Field of Classification Search
None
See application file for complete search history.

(56) References Cited

U.S. PATENT DOCUMENTS

| 6,836,462 | B1* | 12/2004 | Albert ..................... H04L 29/06 370/235 |
| 7,336,935 | B2 | 2/2008 | Ho et al. |
| 8,908,609 | B1* | 12/2014 | Naden et al. ................... 370/329 |
| 2003/0125067 | A1* | 7/2003 | Takeda et al. ................. 455/522 |
| 2003/0165190 | A1* | 9/2003 | Sindhushayana et al. .... 375/225 |
| 2004/0110510 | A1* | 6/2004 | Jeon et al. ..................... 455/450 |
| 2004/0203566 | A1* | 10/2004 | Leung ........................ 455/404.1 |
| 2005/0254442 | A1* | 11/2005 | Proctor, Jr. ........... H04B 7/1555 370/294 |
| 2007/0015462 | A1* | 1/2007 | Dean .................. H04B 7/15557 455/15 |
| 2007/0242766 | A1* | 10/2007 | Xu et al. ....................... 375/260 |
| 2008/0013500 | A1* | 1/2008 | Laroia et al. .................. 370/338 |

(Continued)

FOREIGN PATENT DOCUMENTS

| CN | 101247182 A | 8/2008 |
| CN | 201238302 Y | 5/2009 |

(Continued)

*Primary Examiner* — Ian N Moore
*Assistant Examiner* — Phong La
(74) *Attorney, Agent, or Firm* — Brinks Gilson & Lione (57) ABSTRACT Embodiments of the present invention disclose a method for regulating transmit power and a wireless routing device, which relate to the field of wireless communications technologies, and can adjust transmit power according to a current work category of a wireless routing device in a wireless local area network, thereby ensuring transmission strength of a radio wave or saving electrical energy, and improving user experience. The method in the present invention includes: determining, by a wireless routing device, a data type of to-be-transmitted data; when the data type of the to-be-transmitted data is uplink data, selecting, by the wireless routing device, first transmit power to send the to-be-transmitted data on a preset channel Channel; and when the data type of the to-be-transmitted data is downlink data, selecting, by the wireless routing device, second transmit power to send the to-be-transmitted data on the preset channel Channel.

6 Claims, 6 Drawing Sheets

(56) References Cited

U.S. PATENT DOCUMENTS

| | | | |
|---|---|---|---|
| 2008/0059611 A1* | 3/2008 | Kiji | 709/220 |
| 2008/0068217 A1* | 3/2008 | Van Wyk et al. | 340/870.11 |
| 2008/0186897 A1* | 8/2008 | Rune et al. | 370/315 |
| 2008/0232383 A1* | 9/2008 | Meier et al. | 370/401 |
| 2009/0042593 A1 | 2/2009 | Yavuz et al. | |
| 2009/0154405 A1* | 6/2009 | Choi | H04W 72/1278 370/329 |
| 2009/0181689 A1* | 7/2009 | Lee et al. | 455/450 |
| 2009/0196192 A1* | 8/2009 | Lim et al. | 370/252 |
| 2010/0069111 A1* | 3/2010 | Senba | 455/522 |
| 2010/0075689 A1* | 3/2010 | Uemura et al. | 455/452.1 |
| 2010/0265839 A1* | 10/2010 | Almgren | H04B 7/15535 370/252 |
| 2010/0272009 A1* | 10/2010 | Cheng et al. | 370/315 |
| 2011/0167291 A1 | 7/2011 | Liu et al. | |
| 2011/0319112 A1* | 12/2011 | Jeong et al. | 455/509 |
| 2012/0026940 A1* | 2/2012 | Barbieri et al. | 370/328 |
| 2012/0115537 A1* | 5/2012 | Gaal et al. | 455/522 |

FOREIGN PATENT DOCUMENTS

| | | |
|---|---|---|
| CN | 101779503 A | 7/2010 |
| CN | 102204366 A | 9/2011 |
| WO | WO 2011/100673 A1 | 8/2011 |

* cited by examiner

METHOD FOR REGULATING TRANSMIT POWER AND WIRELESS ROUTING DEVICE

CROSS-REFERENCE TO RELATED APPLICATIONS

This application claims priority to Chinese Patent Application No. 201210205375.2, filed on Jun. 20, 2012, which is hereby incorporated by reference in its entirety.

TECHNICAL FIELD

The present invention relates to the field of wireless communications technologies, and in particular, to a method for regulating transmit power and a wireless routing device.

BACKGROUND

Figure 1A:
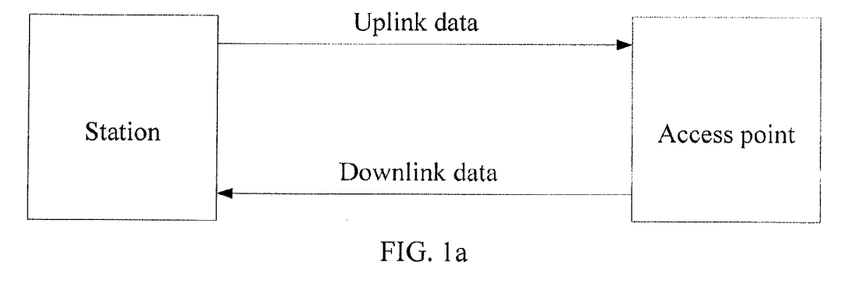
FIG. 1a is a schematic diagram of a specific instance in the prior art.
Figure 1B:
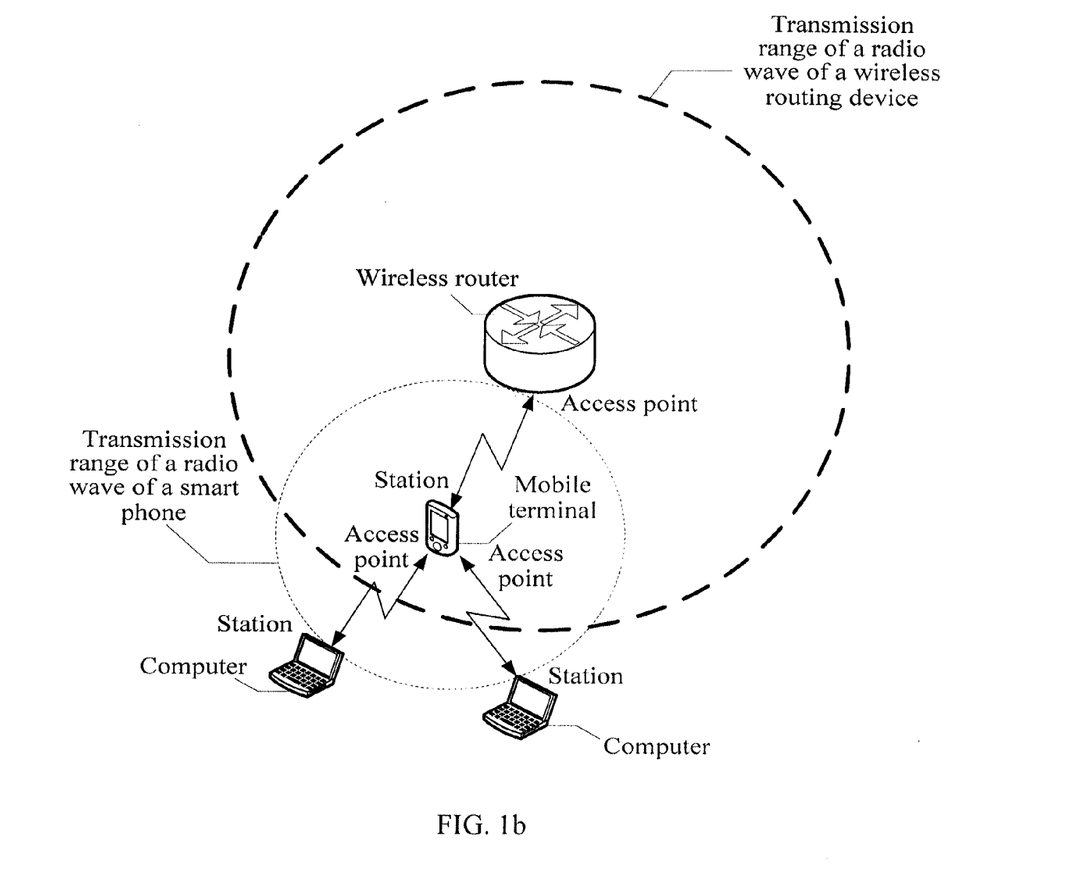
FIG. 1b is a schematic diagram of network architecture of the specific instance in the prior art.

With the development of wireless communications technologies, WLANs (Wireless Local Area Networks, wireless local area networks) have been widely used. Devices in a WLAN may be mainly classified into two categories, that is, an STA (Station, station) and an AP (Access Point, access point). In a practical application, as shown in FIG. 1a, a device serving as an STA transmits uplink data to a device serving as an AP, and the device serving as the AP transmits downlink data to the device serving as the STA. For example, as shown in FIG. 1b, a wireless router serving as an AP is connected to a wireless routing device serving as an STA through a radio wave, so that the wireless routing device can transmit uplink data to the wireless router, and the wireless router can also transmit downlink data to the wireless routing device; similarly, the wireless routing device may also serve as an AP to perform mutual uplink and downlink data transmission with a computer serving as an STA. Transmit power of the devices serving as the AP and the STA are different in various situations. For example, transmit power of the device serving as the AP may generally be 3 dBm to 6 dBm, and transmit power of the device serving as the STA may generally be 17 dBm to 20 dBm.

In the foregoing instance, a specific device in the WLAN may have functions of both the STA and the AP at the same time. For example, a Wi-Fi chip in a wireless routing device shown in FIG. 1b may complete work of the AP and the STA in an existing time division multiplexing manner. In addition, in a working process of the Wi-Fi chip, transmit power of the device is fixed. For example, a Wi-Fi chip in a wireless routing device completes, with transmit power of an AP, work of an AP and an STA in the time division multiplexing manner; for example, in a current moment, a Wi-Fi chip in a wireless routing device transmits, with transmit power of an AP, downlink data to another device serving as an STA, and in this case, the wireless routing device works as an AP; and in a next moment, the Wi-Fi chip in the wireless routing device still transmits, with the transmit power of the AP, uplink data to another device serving as an AP, and in this case, the wireless routing device works as an STA.

The inventor finds that the prior art has at least the following problems:

When a wireless routing device transmits data in an existing time division multiplexing working manner, transmit power of the device is fixed, which causes that the wireless routing device works with the transmit power different from that corresponding to a current category. For example, the transmit power of the wireless routing device serving as the AP is always smaller than the transmit power of the wireless routing device serving as the STA, resulting in a weak radio wave when the wireless routing device works as the STA, so that it is difficult for the wireless routing device to connect to a device serving as the AP, that is, during usage of the wireless routing device, a connection failure always occurs, thereby reducing user experience; the transmit power of the wireless routing device serving as the STA is always greater than the transmit power of the wireless routing device serving as the AP, so that excessive transmit power results in a waste of electrical energy and shortening of working time of the wireless routing device, thereby also reducing user experience.

SUMMARY

Embodiments of the present invention provide a method for regulating transmit power and a wireless routing device, which can adjust transmit power according to a current work category of a wireless routing device in a wireless local area network, thereby ensuring transmission strength of a radio wave or saving electrical energy, and improving user experience.

To achieve the foregoing objectives, the embodiments of the present invention adopt the following technical solutions.

In one aspect, an embodiment of the present invention provides a method for regulating transmit power, where the method includes:

determining, by a wireless routing device, a data type of to-be-transmitted data, where the data type includes uplink data or downlink data;

when the data type of the to-be-transmitted data is the uplink data, selecting, by the wireless routing device, first transmit power to send the to-be-transmitted data on a preset channel Channel, where the first transmit power is transmit power of a radio wave in a process that the wireless routing device serving as an STA sends data to an AP node; and when the data type of the to-be-transmitted data is the downlink data, selecting, by the wireless routing device, second transmit power to send the to-be-transmitted data on the preset channel Channel, where the second transmit power is transmit power of a radio wave in a process that the wireless routing device serving as an AP sends data to an STA node.

In another aspect, an embodiment of the present invention provides an apparatus for regulating transmit power, where the apparatus includes:

a data type identifying module, configured to determine a data type of to-be-transmitted data, where the data type includes uplink data or downlink data;

an uplink sending module, configured to: when the data type of the to-be-transmitted data is the uplink data, select first transmit power to send the to-be-transmitted data on a preset channel Channel, where the first transmit power is transmit power of a radio wave in a process that the wireless routing device serving as an STA sends data to an AP node; and a downlink sending module, configured to: when the data type of the to-be-transmitted data is the downlink data, select second transmit power to send the to-be-transmitted data on the preset channel Channel, where the second transmit power is transmit power of a radio wave in a process that the wireless routing device serving as an AP sends data to an STA node.

In the method for regulating transmit power and the wireless routing device provided by the present invention, the wireless routing device can determine a data type (uplink data or downlink data) of to-be-transmitted data, and works at transmit power corresponding to a data type of the to-be-transmitted data. Compared with the prior art, in the preset invention, transmit power can be adjusted according to a current working mode of the wireless routing device in a wireless local area network, so as to ensure appropriate transmission strength of a radio wave in each working mode of the wireless routing device, thereby avoiding a connection failure due to extremely low transmission strength or a waste of electrical energy due to extremely high transmission strength, and improving user experience.

BRIEF DESCRIPTION OF DRAWINGS

To describe the technical solutions in the embodiments of the present invention more clearly, the following briefly introduces accompanying drawings required for describing the embodiments and the background technologies. Apparently, the accompanying drawings in the following description show merely some embodiments of the present invention, and persons of ordinary skill in the art may further derive other drawings according to these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

To make the advantages of the technical solutions of the present invention more comprehensible, the following describes the present invention in detail with reference to the accompanying drawings and the embodiments.

Embodiment 1

Figure 2:
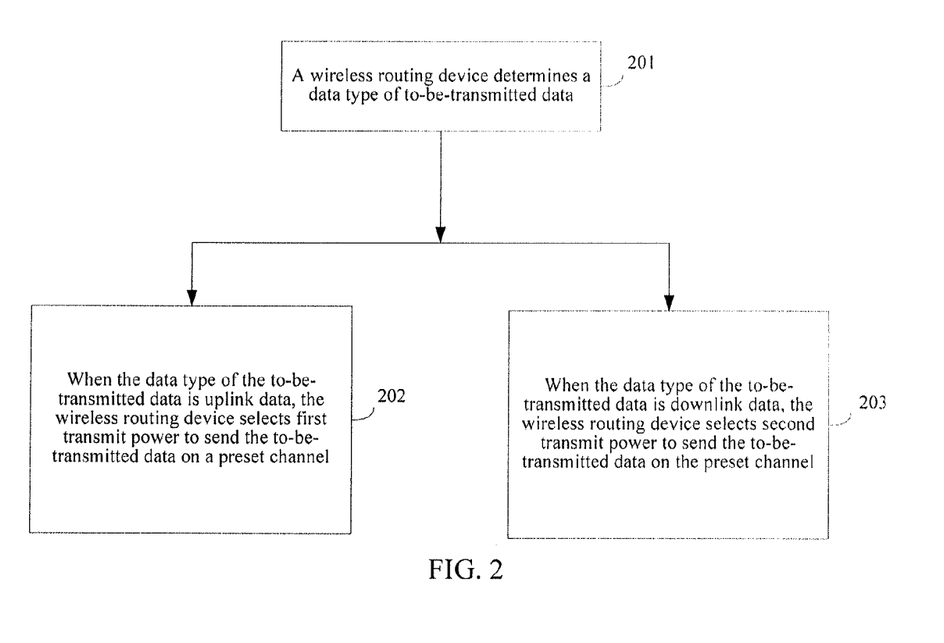
FIG. 2 is a flow chart of a method for regulating transmit power according to Embodiment 1 of the present invention.

An embodiment of the present invention provides a method for regulating transmit power. As shown in FIG. 2, the method includes:

The method in this embodiment may be executed by a wireless routing device, where the wireless routing device includes a communication device a computer, and the like that have a two-way wireless data transmission function. For example, a smart phone designed based on a WIFI protocol of the IEEE 802.11 standard has two working modes. When performing data interaction with an AP (access point) node provided by an operator, the smart phone works in an STA (station) mode and transmits uplink data to the AP node; and when performing data interaction with another device serving as an STA node, the smart phone transmits downlink data to the STA node in an AP mode.

Step 201: A wireless routing device determines a data type of to-be-transmitted data.

The data type includes uplink data or downlink data. The uplink data includes data sent by a device serving as an STA to a device serving as an AP, and the downlink data includes data sent by the device serving as the AP to the device serving as the STA. That is, if the wireless routing device transmits the uplink data, it may be regarded that a current working mode of the wireless routing device is the STA mode; and if the wireless routing device transmits the downlink data, it may be regarded that the current working mode of the wireless routing device is the AP mode.

Step 202: When the data type of the to-be-transmitted data is the uplink data. the wireless routing device selects first transmit power to send the to-be-transmitted data on a preset channel Channel.

The first transmit power is transmit power of a radio wave in a process that the wireless routing device serving as an STA sends data to an AP node.

For example, if the to-be-transmitted data is the uplink data, it indicates that the wireless routing device currently serves as the STA in a WLAN (that is, the wireless routing device works in the STA mode). In this case, transmit power of the wireless routing device may be 17 dBm to 20 dBm, thereby ensuring transmission strength of a radio wave, and reducing a failure probability of connecting, by the wireless routing device, to another device in the WLAN.

Step 203: When the data type of the to-be-transmitted data is the downlink data, the wireless routing device selects second transmit power to send the to-be-transmitted data on the preset channel Channel.

The second transmit power is transmit power of a radio wave in a process that the wireless routing device serving as an AP sends data to an STA node.

For example, if the to-be-transmitted data is the downlink data, it indicates that the wireless routing device currently serves as the AP in the WLAN. In this case, the transmit power of the wireless routing device may be 3 dBm to 6 dBm, so that the wireless routing device may connect to another device in the WLAN at appropriate transmit power, thereby avoiding an increase in energy consumption due to extremely high transmit power.

Specifically, in this embodiment, no matter which kind of transmit power is selected, the wireless routing device sends the to-be-transmitted data on the same channel Channel. For example, a transmission chip in the wireless routing device may implement sending of the to-be-transmitted data by using one channel Channel in a time division multiplexing manner. In addition, in a first period of time, the wireless routing device works in the STA mode, and the transmission chip works at the first transmit power; and in a second period of time, the wireless routing device works in the AP mode, and the transmission chip works at the second transmit power.

In the method for regulating transmit power provided by this embodiment, a wireless routing device can determine a data type (uplink data or downlink data) of to-be-transmitted data, and works at transmit power corresponding to a data type of the to-be-transmitted data. Compared with the prior art, in the preset invention, transmit power can be adjusted according to a current working mode of the wireless routing device in a wireless local area network, so as to ensure appropriate transmission strength of a radio wave in each working mode of the wireless routing device, thereby avoiding a connection failure due to extremely low transmission strength or a waste of electrical energy due to extremely high transmission strength, and improving user experience.

Embodiment 2

Figure 3A:
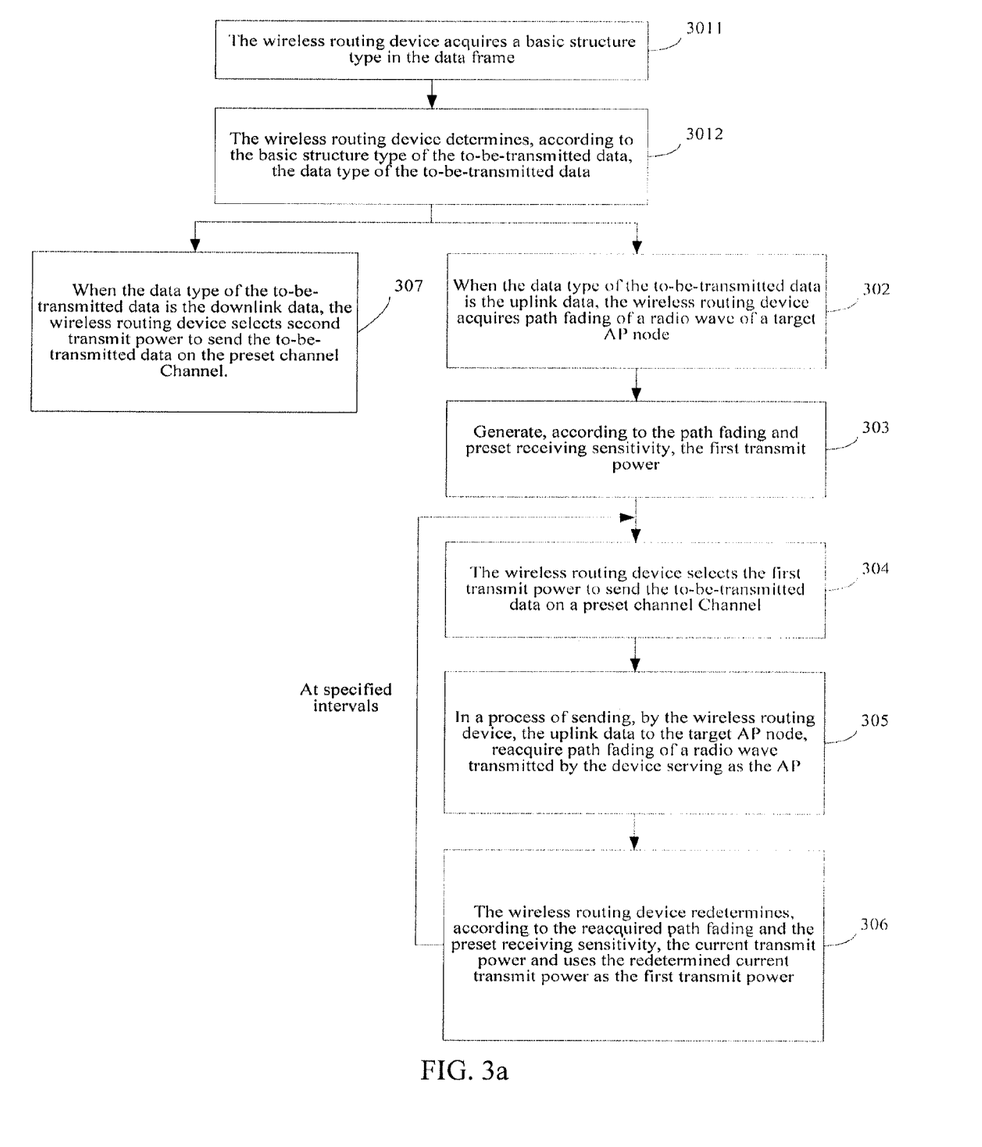
FIG. 3a is a flow chart of a method for regulating transmit power according to Embodiment 2 of the present invention.

An embodiment of the present invention provides a method for regulating transmit power. As shown in FIG. 3a, the method includes:

There may be various methods for a wireless routing device to determine a data type of to-be-transmitted data. In this embodiment, two methods are introduced in detail: 1. as described from step 3011 to step 3012, using a basic structure type in a data frame as identification information to determine the data type of the to-be-transmitted data; 2. as described from step 3013 to step 3014, using a source address in the data frame as identification information to determine the data type of the to-be-transmitted data.

Step 3011: The wireless routing device acquires a basic structure type in the data frame.

The basic structure type includes a field used for representing a current working mode of the wireless routing device.

For example, in the IEEE 802.11 standard, before transmitting data, the wireless routing device encapsulates the data in a data frame at a data link layer, and then transmits the data frame to another device through a wireless network. An address field in the data frame may include content shown in Table 1.

TABLE 1

| Function | ToDS | FromDS | Address1 (Receiving End) | Address2 (Sending End) | Address3 | Address4 |
|---|---|---|---|---|---|---|
| IBSS | 0 | 0 | DA | SA | BSSID | unused |
| To AP (basic structure type) | 1 | 0 | BSSID | SA | DA | unused |
| From AP (basic structure type) | 0 | 1 | DA | BSSID | SA | unused |
| WDS (wireless distribution system) | 1 | 1 | RA | TA | DA | SA |

Address2 represents an address of a transmitting end, that is, the source address in the data frame. Two kinds of specific bytes of the basic structure type are included, that is, 1 0 or 0 1, where 1 0 represents "To AP" in Table 1, that is, currently, the wireless routing device serving as an STA in a WLAN transmits information to an AP; and 0 1 represents "From AP" in Table 1, that is, currently, the wireless routing device serving as an AP in the WLAN transmits information to an STA, For example, in a practical application, the address field in the data frame may be 1 0 BSSID SA, that is, the source address of the data frame is SA and the basic structure type is 1 0.

Step 3012: The wireless routing device determines, according to the basic structure type of the to-be-transmitted data, the data type of the to-be-transmitted data.

For example, as shown in Table 1, the byte 1 0 corresponding to the basic structure type in the address field indicates that the wireless routing device serving as the STA in the WLAN transmits the information to the AP, and the data type is uplink data; and 0 1 indicates that the wireless routing device serving as the AP in the WLAN transmits the information to the STA, and the data type is downlink data.

Figure 3B:
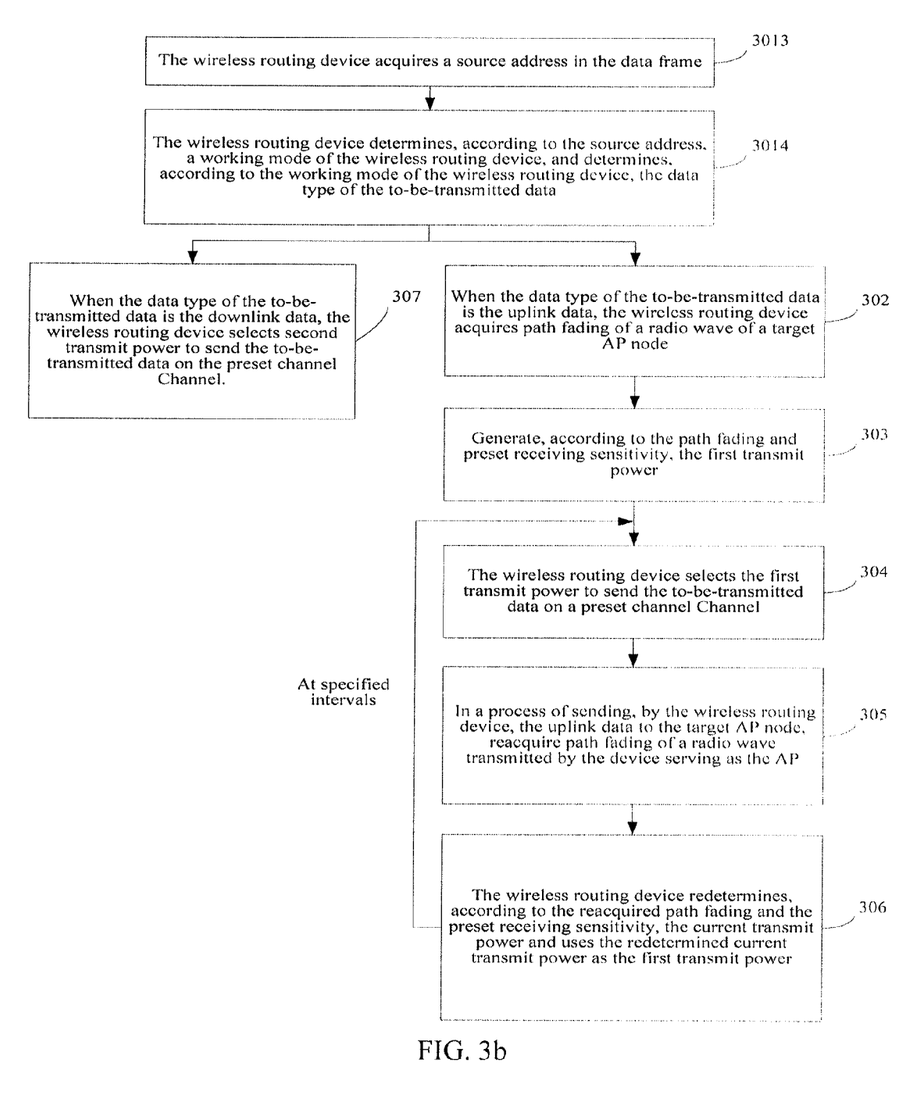
FIG. 3b is a flow chart of the method for regulating transmit power according to Embodiment 2 of the present invention.

Further, optionally, as shown in FIG. 3b, in a case that the identification information is the source address in the data frame, the method includes:

Step 3013: The wireless routing device acquires a source address in the data frame.

Step 3014: The wireless routing device determines, according to the source address, a working mode of the wireless routing device, and determines, according to the working mode of the wireless routing device, the data type of the to-be-transmitted data.

A device category includes an STA or an AP. Furthermore, if the category is the STA, the current working mode of the wireless routing device is an STA mode; and if the category is the AP, the current working mode of the wireless routing device is an AP mode.

For example, as shown in Table 1, Address2 in the address field is the source address, and the wireless routing device may determine, according to the source address, the category of the wireless routing device through an existing technical means. For example, an address table may be pre-stored in the wireless routing device, where the address table includes categories corresponding to different addresses in the current WLAN. When Address2 in the data frame is SA, the category corresponding to SA in the address table is the STA, that is, the wireless routing device is the STA.

That is, the method in step 3011 to step 3012 and the method in step 3013 to step 3014 are two methods for the wireless routing device to determine the current working mode, and the two methods may exist coordinately, and in a practical application, may be selected and executed by a technical person or the wireless routing device according to a specific situation, and may also be executed in a coupling manner to determine the current working mode of the wireless routing device.

Further, optionally, in a practical application of the present invention, the following problems may also exist:

When the wireless routing device serving as the STA transmits the uplink data, a specific AP device is generally required to perform data interaction with the wireless routing device.

In addition, because of relatively high transmit power, the STA in the WLAN is easily affected by fading of a radio wave in a propagation process. For example, in a usage process of the wireless routing device serving as the STA, a distance between the wireless routing device and the AP device is continually changed due to moving of a user, so that path fading between the wireless routing device and the AP device is continually changed. When the path fading is relatively large, set transmit power cannot meet a requirement of radio wave strength, so that a connection failure occurs; and when the path fading is relatively small, the set transmit power far exceeds the requirement of radio wave strength, so that excess electrical energy is consumed. Therefore, this embodiment provides a method procedure in step 302 to step 306 to further optimize the present invention, Step 302: When the data type of the to-be-transmitted data is the uplink data, the wireless routing device acquires path fading of a radio wave of a target AP node.

The target AP node includes a wireless access point currently performing data interaction with the wireless routing device.

Specifically, in this embodiment, in a process of performing data interaction with a device serving as the AP, the wireless routing device may acquire, through the existing technical means, path fading of a radio wave transmitted by the device serving as the AP. For example, signal strength which is of the AP device and is currently received by the wireless routing device is X, and then, according to the specification of the WIFI (Wireless Fidelity, wireless fidelity) protocol, the current path fading is 20-X.

Step 303: Generate, according to the path fading and preset receiving sensitivity, first transmit power.

Specifically, in this embodiment, the receiving sensitivity may be set by the user or automatically set by the wireless routing device by using an existing technology; and the first transmit power is calculated and generated according to the preset receiving sensitivity and the path fading, for example, the receiving sensitivity is Y, and the first transmit power is Y+20-X.

Step 304: The wireless routing device selects the first transmit power to send the to-be-transmitted data on a preset channel Channel.

The first transmit power is first transmit power generated by executing, by the wireless routing device, step 302 to step 303, that is, the wireless routing device may calculate a value of the first transmit power in real time and send the uplink data with newly generated first transmit power.

Further, optionally, the method may further include:

Step 305: In a process of sending, by the wireless routing device, the uplink data to the target AP node, reacquire path fading of a radio wave transmitted by the device serving as the AP at specified intervals.

Specifically, in this embodiment, the wireless routing device may reacquire the path fading at specific intervals.

Step 306: The wireless routing device redetermines, according to the reacquired path fading and the preset receiving sensitivity, the current transmit power and uses the redetermined current transmit power as the first transmit power.

Figure 4:
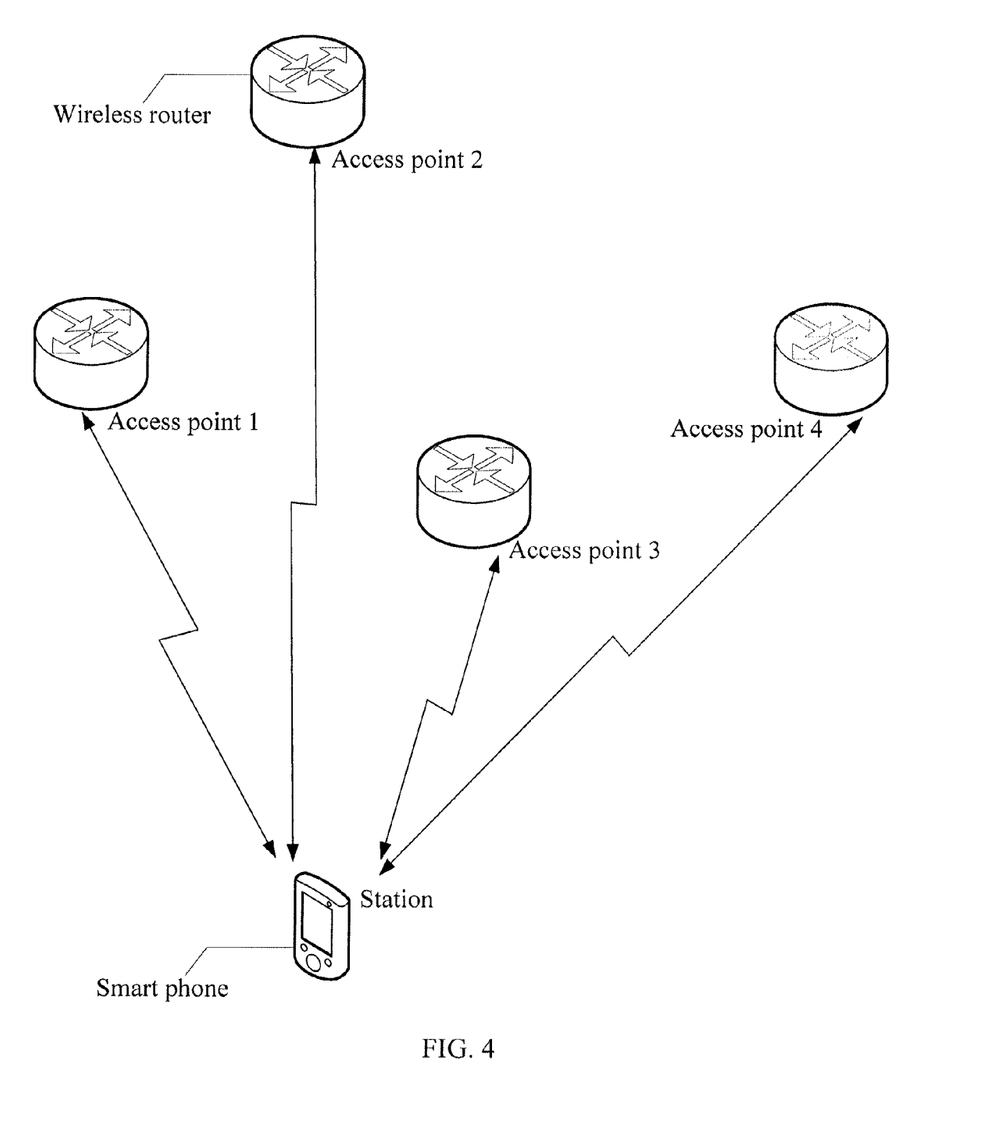
FIG. 4 is a schematic diagram of network architecture of a specific instance according to Embodiment 2 of the present invention.

Specifically, in this embodiment, after reacquiring the path fading, the wireless routing device needs to re-calculate and generate the first transmit power, so that the wireless routing device can update the first transmit power in real time according to a change of the path fading. For example:

ClubWifi is a wireless communications technology based on the WIFI protocol. A method procedure of ClubWifi in a practical application generally includes: As shown in FIG. 4, in a WIFI network, one smart phone may perform data interaction with four wireless routers in a time division multiplexing manner at the same time, where the four wireless routers serve as APs and the smart phone serves as the STA. That is, in a first period of time, the STA and an AP1 are mutually connected through the wireless network and perform data interaction, and meanwhile, an AP2, AP3, and AP4 stand by; in a second period of time, the STA and the AP2 are mutually connected through the wireless network and perform data interaction, and meanwhile, the AP1, AP3, and AP4 stand by. The rest may be deduced by analogy, and the smart phone serving as the STA performs data interaction with the wireless routers serving as the APs in turn.

However, distances between the four wireless routers and the smart phone are different from each other, and because of movement of the user, the distances between the smart phone and the four wireless routers change at any time. In this case, when the smart phone connects to one wireless router through the wireless network, path fading of a radio wave between the smart phone and the wireless router is reacquired, and transmit power of the smart phone is redetermined, so that the smart phone can use most appropriate transmit power to transmit the data to different wireless routers.

Step 307: When the data type of the to-be-transmitted data is the downlink data, the wireless routing device selects second transmit power to send the to-be-transmitted data on the preset channel Channel.

The second transmit power is transmit power of a radio wave in a process that the wireless routing device serving as an AP sends data to an STA node.

Specifically, in this embodiment, the second transmit power may be preset by the user or automatically set by the wireless routing device through an existing means.

In the method for regulating transmit power provided by this embodiment, in the STA mode (that is, when the to-be-transmitted data is the uplink data), the wireless routing device can work at transmit power of a radio wave in data interaction performed between the wireless routing device serving as the STA and the device serving as the AP, or in the AP mode (that is, when the to-be-transmitted data is the downlink data), work at transmit power of a radio wave in data interaction performed between the wireless routing device serving as the AP and the device serving as the STA; furthermore, in a process of transmitting, by the wireless routing device, the uplink data, optimal transmit power can be determined according to path fading in real time, and the optimal transmit power is used as the transmit power for the wireless routing device to transmit the uplink data. Compared with the prior art, in the preset invention, transmit power can be adjusted according to a current working mode of the wireless routing device in a wireless local area network, so as to ensure appropriate transmission strength of a radio wave in each working mode of the wireless routing device, thereby avoiding a connection failure due to extremely low transmission strength or a waste of electrical energy due to extremely high transmission strength, and improving user experience.

Embodiment 3

Figure 5:
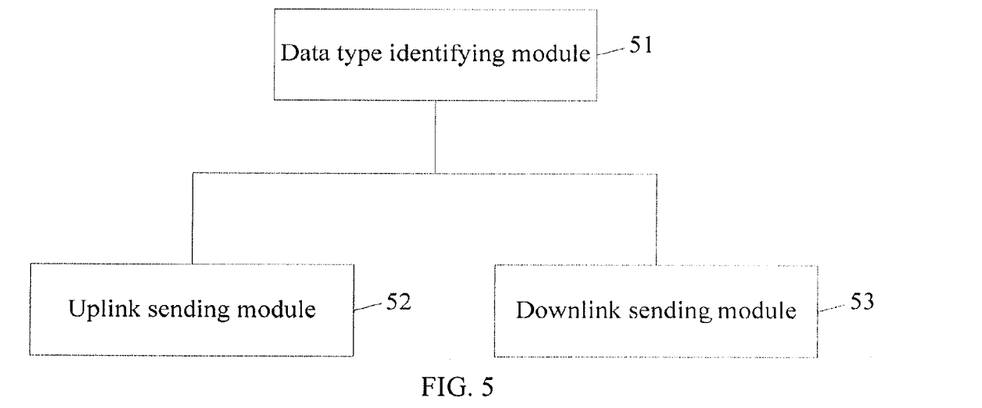
FIG. 5 is a schematic structural diagram of a wireless routing device according to Embodiment 3 of the present invention.

An embodiment of the present invention provides a wireless routing device. As shown in FIG. 5, the device includes:

The device in the present invention may run on a wireless routing apparatus. The wireless routing apparatus includes a communication device and a computer that have a wireless data transmission function. The device includes:

a data type identifying module 51, configured to determine a data type of to-be-transmitted data, where the data type includes uplink data or downlink data an uplink sending module 52, configured to: when the data type of the to-be-transmitted data is the uplink data, select first transmit power to send the to-be-transmitted data on a preset channel Channel, where the first transmit power is transmit power of a radio wave in a process that the wireless routing device serving as an STA sends data to an AP node; and a downlink sending module 53, configured to: when the data type of the to-be-transmitted data is the downlink data, select second transmit power to send the to-be-transmitted data on the preset channel Channel, where the second transmit power is transmit power of a radio wave in a process that the wireless routing device serving as an AP sends data to an STA node.

The wireless routing device provided by this embodiment can determine a data type (uplink data or downlink data) of to-be-transmitted data through the data type identifying module, and works at transmit power corresponding to the data type of the to-be-transmitted data. Compared with the prior art, in the preset invention, transmit power can be adjusted according to a current working mode of the wireless routing device in a wireless local area network, so as to ensure appropriate transmission strength of a radio wave in each working mode of the wireless routing device, thereby avoiding a connection failure due to extremely low transmission strength or a waste of electrical energy due to extremely high transmission strength, and improving user experience.

Embodiment 4

Figure 6:
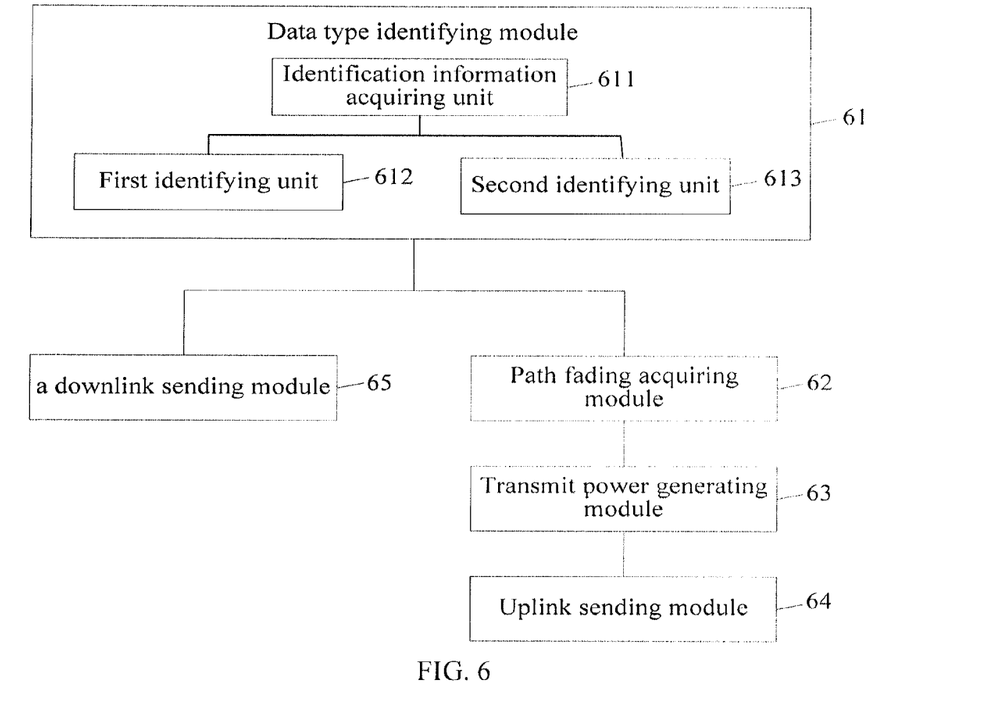
FIG. 6 is a schematic structural diagram of a wireless routing device according to Embodiment 4 of the present invention.

An embodiment of the present invention provides a wireless routing device. As shown in FIG. 6, the device includes:
a data type identifying module 61, configured to determine a data type of to-be-transmitted data, where
the data type includes uplink data or downlink data,
the data type identifying module 61 includes:
an identification information acquiring unit 611, configured to acquire identification information of the to-be-transmitted data, where the identification information includes a basic structure type of the to-be-transmitted data or a source address of the to-be-transmitted data, and
a first identifying unit 612, configured to: if the identification information is the basic structure type of the to-be-transmitted data, determine, according to the basic structure type of the to-be-transmitted data, the data type of the to-be-transmitted data, where the basic structure type includes a field used to indicate that the to-be-transmitted data is the uplink data or the downlink data, and
furthermore, the data type identifying module 61 includes:
a second identifying unit 613, configured to: if the identification information is the source address of the to-be-transmitted data, determine, according to the source address, a working mode, and determine, according to the working mode, the data type of the to-be-transmitted data, where the working mode includes an STA mode or an AP mode, where
in the STA mode, the data type of the to-be-transmitted data is the uplink data, and in the AP mode, the data type of the to-be-transmitted data is the downlink data;
a path fading acquiring module 62, configured to: when the data type of the to-be-transmitted data is the uplink data, and before the wireless routing device selects the first transmit power to send the to-be-transmitted data on a preset channel Channel, acquire path fading of a radio wave of a target AP node, where the target AP node includes a wireless access point currently performing data interaction with the wireless routing device, where
the path fading acquiring module 62 is further configured to: in a process of sending the uplink data to the target AP node, acquire current path fading of a radio wave of the target AP node at specified intervals, and acquire current transmit power according to newly acquired path fading and preset receiving sensitivity;
a transmit power generating module 63, configured to generate, according to the path fading and the preset receiving sensitivity, the first transmit power, where
the transmit power generating module 63 is further configured to use the current transmit power as the first transmit power;
an uplink sending module 64, configured to: when the data type of the to-be-transmitted data is the uplink data, select the first transmit power to send the to-be-transmitted data on the preset channel Channel, where
the first transmit power is transmit power of a radio wave in a process that the wireless routing device serving as an STA sends data to an AP node; and
a downlink sending module 65, configured to: when the data type of the to-be-transmitted data is the downlink data, select second transmit power to send the to-be-transmitted data on the preset channel Channel, where
the second transmit power is transmit power of a radio wave in a process that the wireless routing device serving as an AP sends data to an STA node.

The wireless routing device provided by this embodiment can determine a data type (uplink data or downlink data) of to-be-transmitted data through the data type identifying module, and works at transmit power corresponding to the data type of the to-be-transmitted data; furthermore, in a process of transmitting, by the wireless routing device, the uplink data, optimal transmit power can also be determined through the transmit power generating module according to the path fading in real time, and the optimal transmit power is used as the transmit power for the wireless routing device to transmit the uplink data. Compared with the prior art, in the preset invention, transmit power can be adjusted according to a current working mode of the wireless routing device in a wireless local area network, so as to ensure appropriate transmission strength of a radio wave in each working mode of the wireless routing device, thereby avoiding a connection failure due to extremely low transmission strength or a waste of electrical energy due to extremely high transmission strength, and improving user experience.

Person of ordinary skill in the art may understand that all or a part of the procedures of the methods in the foregoing embodiments may be implemented by a computer program instructing relevant hardware. The program may be stored in a computer readable storage medium. When the program is run, the procedures of the methods in the foregoing embodiments are performed. The storage medium may be a magnetic disk, an optical disk, a read-only memory (Read-Only Memory, ROM), or a random access memory (Random Access Memory, RAM), or the like.

The foregoing description is merely specific implementation manners of the present invention, but is not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:
1. A method for regulating transmit power, comprising:
determining, by a smart phone, a data type of to-be-transmitted data according to identification information in a data frame of the to-be-transmitted data, wherein the data type comprises uplink data or downlink data;
when the data type of the to-be-transmitted data is the uplink data, selecting, by the smart phone, first transmit power to send the to-be-transmitted data on a preset channel Channel, wherein the first transmit power is transmit power of a radio wave in a process that the smart phone serving as an STA sends data to an AP node; and
when the data type of the to-be-transmitted data is the downlink data, selecting, by the smart phone, second transmit power to send the to-be-transmitted data on the preset channel Channel, wherein the second transmit power is transmit power of a radio wave in a process that the smart phone serving as an AP sends data to an STA node;
wherein the determining, by the smart phone, the data type of the to-be-transmitted data comprises:
acquiring, by the smart phone, identification information of the to-be-transmitted data, wherein the identification information comprises a basic structure type of the to-be-transmitted data or a source address of the to-be-transmitted data; and if the identification information is the basic structure type of the to-be-transmitted data, determining, by the smart phone and according to the basic structure type of the to-be-transmitted data, the data type of the to-be-transmitted data, wherein the basic structure type comprises a field used to indicate that the to-be-transmitted data is the uplink data or the downlink data; and if the identification information is the source address of the to-be-transmitted data, determining, by the smart phone and according to the source address, a working mode of the smart phone, and determining, according to the working mode of the smart phone, the data type of the to-be-transmitted data, wherein the working mode comprises: an STA mode or an AP mode, wherein in the STA mode, the data type of the to-be-transmitted data is the uplink data; and in the AP mode, the data type of the to-be-transmitted data is the downlink data.

2. The method for regulating transmit power according to claim 1, wherein when the data type of the to-be-transmitted data is the uplink data, and before the selecting, by the smart phone, the first transmit power to send the to-be-transmitted data on the preset channel Channel, the method further comprises:

acquiring, by the smart phone, path fading of a radio wave of a target AP node, wherein the target AP node comprises a wireless access point currently performing data interaction with the smart phone; and generating, according to the path fading and preset receiving sensitivity, the first transmit power.

3. The method for regulating transmit power according to claim 2, comprising:

in a process of sending the uplink data to the target AP node, acquiring, by the smart phone, current path fading of a radio wave of the target AP node at specified intervals, and acquiring current transmit power according to newly acquired path fading and the preset receiving sensitivity; and using the current transmit power as the first transmit power.

4. A smart phone, comprising:
a processor; and
a non-transitory storage medium accessible to the processor, the non-transitory storage medium configured to store instructions causing the to perform acts comprising:
determining a data type of to-be-transmitted data according to identification information in a data frame of the to-be-transmitted data, wherein the data type comprises uplink data or downlink data;

when the data type of the to-be-transmitted data is the uplink data, selecting first transmit power to send the to-be-transmitted data on a preset channel Channel, wherein the first transmit power is transmit power of a radio wave when the smart phone serving as an STA sends data to an AP node; and when the data type of the to-be-transmitted data is the downlink data, selecting second transmit power to send the to-be-transmitted data on the preset channel Channel, wherein the second transmit power is transmit power of a radio wave when smart phone serving as an AP sends data to an STA node;

acquiring identification information of the to-be-transmitted data, wherein the identification information comprises a basic structure type of the to-be-transmitted data or a source address of the to-be-transmitted data;

if the identification information is the basic structure type of the to-be-transmitted data, determining, according to the basic structure type of the to-be-transmitted data, the data type of the to-be-transmitted data, wherein the basic structure type comprises a field used to indicate that the to-be-transmitted data is the uplink data or the downlink data; and if the identification information is the source address of the to-be-transmitted data, determining, according to the source address, a working mode, and determine, according to the working mode, the data type of the to-be-transmitted data, wherein the working mode comprises: an STA mode or an AP mode, wherein in the STA mode, the data type of the to-be-transmitted data is the uplink data; and in the AP mode, the data type of the to-be-transmitted data is the downlink data.

5. The smart phone according to claim 4, wherein the non-transitory storage medium configured to store instructions causing the processor to perform acts comprising:

acquiring path fading of a radio wave of a target AP node, wherein the target AP node comprises a wireless access point currently performing data interaction with the smart phone; and generating, according to the path fading and preset receiving sensitivity, the first transmit power.

6. The smart phone according to claim 5, wherein the non-transitory storage medium configured to store instructions causing the processor to perform acts comprising:

when sending the uplink data to the target AP node, acquiring current path fading of a radio wave of the target AP node at specified intervals, and acquiring current transmit power according to newly acquired path fading and the preset receiving sensitivity; and using the current transmit power as the first transmit power.

* * * * *